(12) United States Patent
Maggioni

(10) Patent No.: US 7,034,807 B2
(45) Date of Patent: Apr. 25, 2006

(54) METHOD AND CONFIGURATION FOR INTERACTING WITH A DISPLAY VISIBLE IN A DISPLAY WINDOW

(75) Inventor: Christoph Maggioni, Berlin (DE)

(73) Assignee: Siemens Aktiengesellschaft, Munich (DE)

( * ) Notice: Subject to any disclaimer, the term of this patent is extended or adjusted under 35 U.S.C. 154(b) by 491 days.

(21) Appl. No.: 09/790,030

(22) Filed: Feb. 21, 2001

(65) Prior Publication Data

US 2001/0020933 A1    Sep. 13, 2001

(30) Foreign Application Priority Data

Feb. 21, 2000    (DE) ................. 100 07 891

(51) Int. Cl.
*G09G 3/24* (2006.01)

(52) U.S. Cl. .................. 345/173; 345/156

(58) Field of Classification Search ........ 345/156–158, 345/145–146, 173, 175, 179; 353/29, 122; 359/443, 453, 638, 639, 641

See application file for complete search history.

(56) References Cited

U.S. PATENT DOCUMENTS

| | | | |
|---|---|---|---|
| 4,843,568 A | | 6/1989 | Krueger et al. |
| 5,528,263 A | * | 6/1996 | Platzker et al. .............. 345/156 |
| 5,598,265 A | * | 1/1997 | De Groot .................. 356/360 |
| 5,736,975 A | * | 4/1998 | Lunetta ...................... 345/156 |
| 5,789,739 A | | 8/1998 | Schwarz |
| 6,339,748 B1 | * | 1/2002 | Hiramatsu .................. 702/159 |
| 6,414,672 B1 | * | 7/2002 | Rekimoto et al. .......... 345/173 |
| 6,481,851 B1 | * | 11/2002 | McNelley et al. .......... 353/28 |
| 6,522,311 B1 | * | 2/2003 | Kadowaki et al. .......... 345/7 |
| 6,545,670 B1 | * | 4/2003 | Pryor ........................ 345/173 |

FOREIGN PATENT DOCUMENTS

| | | |
|---|---|---|
| DE | 43 12 672 A1 | 10/1994 |
| DE | 44 23 005 C1 | 11/1995 |
| DE | 195 39 955 A1 | 4/1997 |
| DE | 195 43 959 | 5/1997 |
| DE | 196 02 592 A1 | 7/1997 |
| DE | 197 08 240 A1 | 9/1998 |
| DE | 197 08 240 C2 | 10/1999 |
| EP | 0 829 798 A2 | 3/1998 |
| EP | 0 977 159 A1 | 2/2000 |
| GB | 2 263 765 A | 8/1993 |
| WO | WO 95/34881 | 12/1995 |

\* cited by examiner

*Primary Examiner*—Ricardo Osorio
*Assistant Examiner*—Mansour M. Said
(74) *Attorney, Agent, or Firm*—Laurence A. Greenberg; Werner H. Stemer; Ralph E. Locher

(57) ABSTRACT

A configuration for interacting with a display visible in a display window includes a recording unit for recording a pointer object in a vicinity of a display window. In addition, a computer unit is used to determine a position of the pointer object within a display of the display window, and the computer unit is connected to the recording unit. Part of the display can be statically mounted on the display window, in particular, printed thereon. A screen, in particular, a flat screen, can be used for generating at least part of the display. A projector can be used for projecting part of the display onto the display window. Part of the display window can be a semi-transparent or coated area. The recording unit can be behind the display window or above or below the display. A reflective surface for reflecting a beam path from and to the recording unit can be placed above or below the display.

32 Claims, 5 Drawing Sheets

METHOD AND CONFIGURATION FOR INTERACTING WITH A DISPLAY VISIBLE IN A DISPLAY WINDOW

BACKGROUND OF THE INVENTION

Field of the Invention

The invention relates to a method and a configuration for interacting with a display visible in a display window.

In a commercially available touchscreen, a user moves his finger on an area and, thus, moves a mouse pointer on a screen. If the mouse pointer is at the desired position, tapping briefly on the touchscreen triggers the action associated with the position.

In addition, U.S. Pat. No. 5,528,263 to Platzker et al., titled "Interactive projected video image display system," and German Patent DE 197 08 240 C1 disclose a configuration for interaction, a so-called virtual touchscreen. Recording an interaction component, e.g., a hand or a pointer rod, together with an interaction area onto which, preferably, a graphical user interface is projected makes it possible to interact directly on the graphical user interface, and the division described above between display of the user interface and the touchscreen is eliminated.

Display windows have the advantage that they present information about available goods or services attractively for the customers, in particular, even outside normal opening hours. The display window itself provides the customers with no opportunity for interaction, however; instead, conventional display windows offer nothing more than a mere look at the goods and/or services presented behind the display window.

SUMMARY OF THE INVENTION

It is accordingly an object of the invention to provide a method and a configuration for interacting with a display visible in a display window that overcomes the herein aforementioned disadvantages of the heretofore-known devices and methods of this general type and that specifies a configuration for interacting with a display visible in a display window.

With the foregoing and other objects in view, there is provided, in accordance with the invention, a configuration for interacting with a display visible in a display window, including a recording unit for recording a pointer object in a vicinity of a display window, and a computer unit used to determine a position of the pointer object within a display of the display window, the computer unit connected to the recording unit.

To achieve the objectives of the invention, a configuration for interacting with a display visible in a display window includes a recording unit that records a pointer object in the vicinity of the display window. In addition, a computer unit is provided and used to determine a position of the pointer object within the display.

In such a context, the position of the pointer object pointing to a section within the display visible in the display window is determined. The section is, in particular, linked to a prescribed action, i.e., the user can trigger the linked action using the area. One possibility for triggering the action is for the user to leave the pointer object over the area for a prescribed length of time. Another possibility is for the action to be triggered when the distance between the pointer object and the display window is less than a prescribed value. Thus, the user is able to move an input unit, comparable to a computer mouse, by moving the pointer object within the visible display. The action is triggered—equivalent to a "click" or "double click" on the computer mouse— in the manner described above.

It is, thus, possible for the customer to receive information interactively at the display window or even to take advantage of particular offers by interacting at or with the display window. Examples of such interaction are:

putting together an individual motor vehicle using a virtual catalog in the display window of a motor vehicle vendor;

information about travel offers in the display window of a travel agent;

other information or putting together offers for individual requirements; and purchasing, booking, or preselecting a particular service.

A great advantage of the invention is that the interaction with the display window is largely maintenance free for the shop owner or operator of the display window because the customer causes no mechanical wear through the contactless interaction. In addition, the scenario described is extremely immune to potential damage, e.g., as a result of vandalism. Finally, the user is assured simple operation and, hence, a high level of user friendliness.

In accordance with another feature of the invention, at least part of the display is to be statically connected to, in particular, printed on, the display window. The configuration is particularly suitable for fixed operating patterns having a plurality of areas each having a predetermined functional scope. An additionally changing content can nonetheless be provided such that some of the information in the display is supplied with constantly new (nonstatic) contents. An example of functions statically connected to a respective area are navigation switches for "forward", "back", "beginning", and "end".

In accordance with a further feature of the invention, the display, in particular, part of the display, is to be generated using a screen, in particular, a flat screen. For such a purpose, the flat screen, for example, can be disposed behind the display window and can supply the user with changing displays. The screen is connected to the computer unit.

In such regard, it should be noted that the term "behind" the display window denotes what the display window separates from the customer. Accordingly, "in front of" the display window denotes the space used by the customer, in particular, for the purposes of interaction.

In accordance with an added feature of the invention, a projector is provided and set up such that at least part of the display can be projected onto the display window. In such a context, it is advantageous for at least part of the display window to have a semitransparent or a coated area. The area allows the display projected into the display window from the projector to be made easy to read for the customer.

In accordance with an additional feature of the invention, the recording unit is at least one camera.

In accordance with yet another features of the invention, the recording unit is behind the display window, above the display, or below the display.

In accordance with again an additional feature of the invention, the recording unit is a camera and a beam splitter is provided that is set up to have the camera record two different beam paths. Such recordation allows the position of the pointer object to be determined with just one camera using the two different beam paths (for example by a triangulation method). To split the beam path, a high-quality mirror can be provided, for example. The computer unit, thus, receives just one picture from the single camera, but the picture contains two different beam paths, that is to say two different image sequences over time for determining the position of the pointer object in the space in front of the display window. These image sequences coming from different perspectives can be used to determine the position of the pointer object in front of the display visible on the display window. The position is used to establish whether or not the user is moving the pointer object over an area that is linked to a prescribed action and whether or not the user is triggering the prescribed action (for the trigger mechanism, see above and below).

In accordance with yet an added feature of the invention, two cameras each record the space in front of the display visible on the display window. In such a context, the cameras are advantageously set up to record the pointer object in front of the display that is visible on the display window from different perspectives. The different perspectives make it possible, as described above, to determine the position of the pointer object in front of the display visible on the display window. Such determination is crucial for triggering actions using the pointer object.

In accordance with yet a further feature of the invention, the at least one camera, and, in particular, each camera, to be behind the display window. Such placement ensures that the camera is withdrawn from the physical region of action of the user and from various weathering influences. An optical deflection unit may be provided for each camera behind the display window, with the optical deflection unit set up to direct the beam path from the associated camera into the space in front of the display visible on the display window. If the user enters into interaction, the user moves the pointer object into the space, and, thus, the at least one camera takes a picture of the pointer object (from different perspectives).

In accordance with yet an additional feature of the invention, the at least one deflection unit includes at least one of a prism and at least one mirror.

In such a context, it should be noted that one or more (optical) deflection units might be provided. A particularly crucial point is that the beam path for each camera and each partial beam path from each camera is oriented toward the space in front of the display visible in the display window, and, hence, the pointer object used for interaction can be recorded.

In accordance with still another feature of the invention, the at least one deflection unit to be in front of the display window.

In accordance with still a further feature of the invention, the at least one camera is disposed below the display. Such a position advantageously provides a reflective surface above the display. The surface allows the pointer object to be recognized with stark contrast against the background, which produces good results even under adverse light conditions, and, hence, results in a high level of acceptance by the user when interacting with the display window.

If the reflective surface is above the display, the positioning provides an additional advantage that the reflective surface hardly gets dirty and, in particular, can easily be withdrawn from weathering influences by providing an additional roof over the region in front of the display window. The configuration ensures that reflection has a high quality.

In accordance with still an added feature of the invention, at least one camera is above the display. With such a positioning, a reflective surface can be provided below the display and can be set up to reflect to the camera the beam path from the camera.

Alternatively, the camera and, if applicable, the deflection unit, and optionally the reflective surface, can also be disposed at the side of the display, in particular, at arbitrary angles to the display window. The illustrated embodiments above and below the display are just two of a large number of options.

To additionally increase the recognition quality of the pointer object, an illumination unit can be provided to illuminate the space in front of the display visible on the display window with light waves in the invisible spectral range, in particular, in the infrared light range. In such a context, the illumination unit can be operated in pulsed mode, in particular. Preferably, the illumination unit includes at least one infrared light source, in particular, at least one infrared light-emitting diode.

The computer unit is used to evaluate the image sequences supplied by the at least one camera from different perspectives, and, thus, to determine the position of the pointer object in front of the display visible in the display window. Based on the position of the pointer object, a prescribed action is triggered. In particular, the prescribed action is triggered when the pointer object lingers on an area displayed within the display for a prescribed length of time. In such a context, the displayed area has a particular functional scope executed in the event of such triggering by the computer unit. Alternatively, the prescribed action can be triggered after a prescribed proximity as the pointer object approaches the display window.

In accordance with again another feature of the invention, it is possible to determine the position of the pointer object using a triangulation method.

In accordance with again a further feature of the invention, the pointer object is a hand or a finger of a user.

In accordance with a concomitant feature of the invention, a movement of the pointer object is converted into a movement of an analog pointer instrument (comparable to a mouse pointer) by the at least one camera and by the computer unit.

With the objects of the invention in view, there is also provided method for interacting with a display visible in a display window, including the steps of recording a pointer object in a vicinity of a display window, determining a position of the pointer object within a display of the display window, and triggering a prescribed action based upon the pointer object pointing to a prescribed area within the display.

Other features that are considered as characteristic for the invention are set forth in the appended claims.

Although the invention is illustrated and described herein as embodied in a method and configuration for interacting with a display visible in a display window, it is, nevertheless, not intended to be limited to the details shown because various modifications and structural changes may be made therein without departing from the spirit of the invention and within the scope and range of equivalents of the claims.

The construction and method of operation of the invention, however, together with additional objects and advantages thereof, will be best understood from the following description of specific embodiments when read in connection with the accompanying drawings.

DESCRIPTION OF THE PREFERRED EMBODIMENTS

Figure 1:
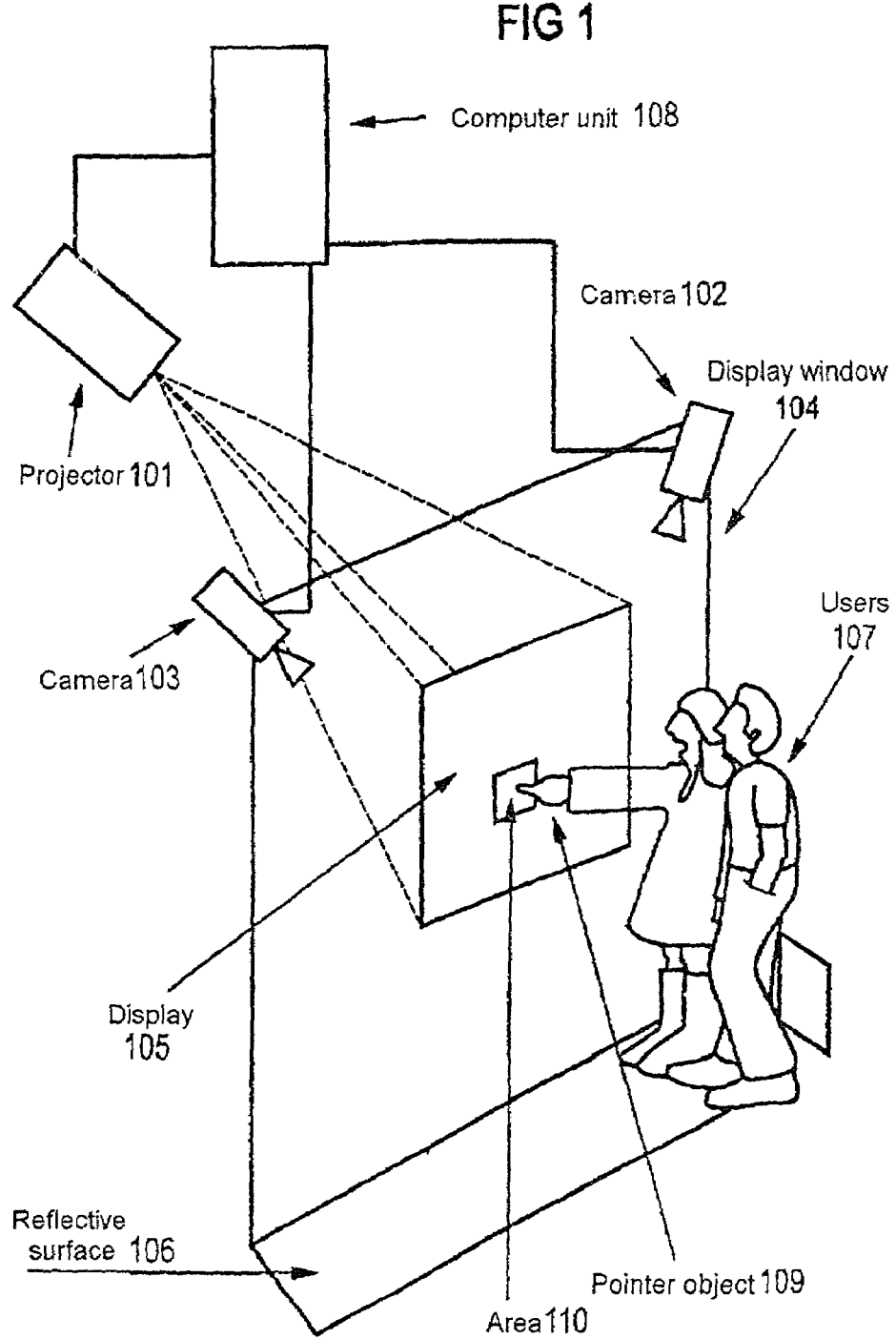
FIG. 1 is a diagrammatic, perspective view of a configuration for interacting with a display window according to the invention.

In all the figures of the drawing, sub-features and integral parts that correspond to one another bear the same reference symbol in each case.

Referring now to the figures of the drawings in detail and first, particularly to FIG. 1 thereof, there is shown a diagrammatic illustration of a configuration for a user's 107 interaction with a display window 104. The hand or the finger of the user 107 is used as a pointer object 109. A projector 101 projects a display 105 into the display window 104. The display 105 presents to the user 107 at least one area 110 in the form of a virtual switch and that, when "selected", triggers a prescribed action on a computer unit 108. The "selection" takes the form, in particular, of the user 107 leaving the pointer object 109 in front of the area 110 for a prescribed length of time. Alternatively, the area can also be "selected" by virtue of the user 107 moving his pointer object 109 closer to the display window 104 in front of the area 110 than a prescribed threshold value. The position of the pointer object 109 in front of the display 105 or the area 110 is determined by the two cameras 102, 103 in conjunction with the computer unit 108. The two cameras 102, 103 supply pictures of the pointer object 109, that is to say, in particular, of the space in front of the display 105, from two different perspectives. Preferably, the beam path from the two cameras 102, 103 is illuminated with infrared light reflected from a reflective surface 106 to the camera. If a pointer object 109 moves in the beam path, the movement can be recognized with stark contrast against the background. The computer unit 108 determines, from the pictures from the two cameras 102 and 103, the position of the pointer object 109 in front of the display 105. In particular, a triangulation method is used; in general, the two two-dimensional displays supplied by the cameras 102, 103 are used to infer the three-dimensional position of the pointer object 109 in front of the display 105 from the difference in the perspective of the two displays. In addition, the computer unit 108 also drives the projector 101. Thus, the combination of computer unit 108, projector 101, display 105, cameras 102, 103, and pointer object 109 represents a configuration for interaction. In the interaction configuration, the computer unit 108 uses the projector 101 to produce a dynamic display 105, and the cameras 102, 103 capture the interaction of the user 107 using his pointer object 109. Prescribed actions are triggered in relation to the movement of the pointer object 109 in front of the display 105.

Figure 2:
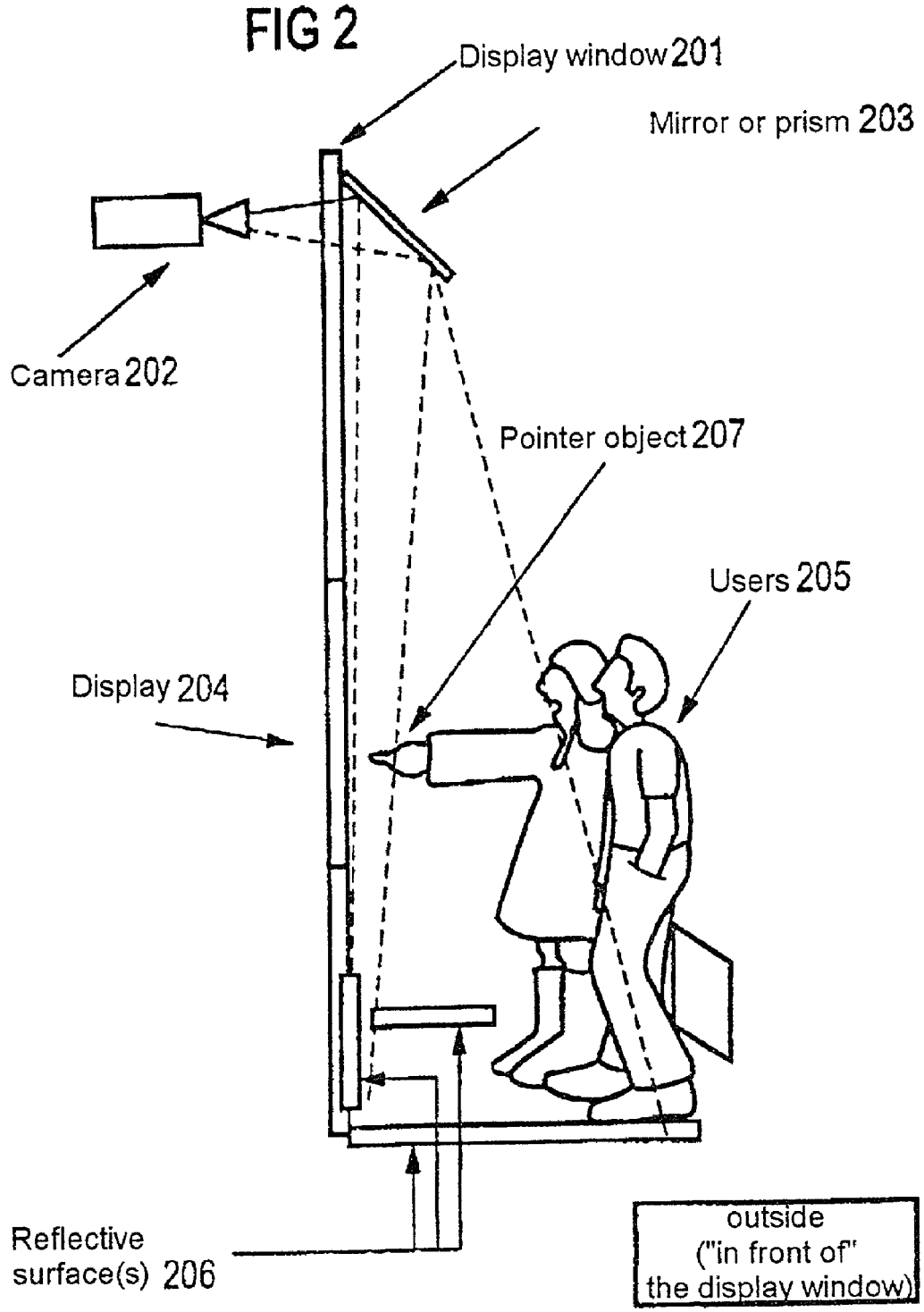
FIG. 2 is a diagrammatic, side view of a first scenario for a user's interaction with a display window according to FIG. 1.

FIG. 2 shows a side view of a first scenario for a user's 205 interaction with a display window 201. A camera 202 is disposed behind the display window 201, with the beam path of the camera 202 being deflected onto the region in front of the display window by a mirror or prism 203. The user 205 interacts on a display 204 using the user's finger as a pointer object 207. For example, as shown in FIG. 1, the display 204 is reproduced in the display window 201 by a projector. Alternatively, the display 204 may also be a flat screen in or behind the display window 201. To permit better recognition of the pointer object 207, infrared light is imitated and/or generated, preferably using the camera. In addition, reflective surfaces 206 are provided below the display 204 so that the pointer object 207 is detected in the beam path between the camera 202, the mirror or prism 203, and the reflective surfaces 206. The configuration starkly emphasizes the user's 205 pointer object against the background, and recognition is, thus, improved.

Figure 3:
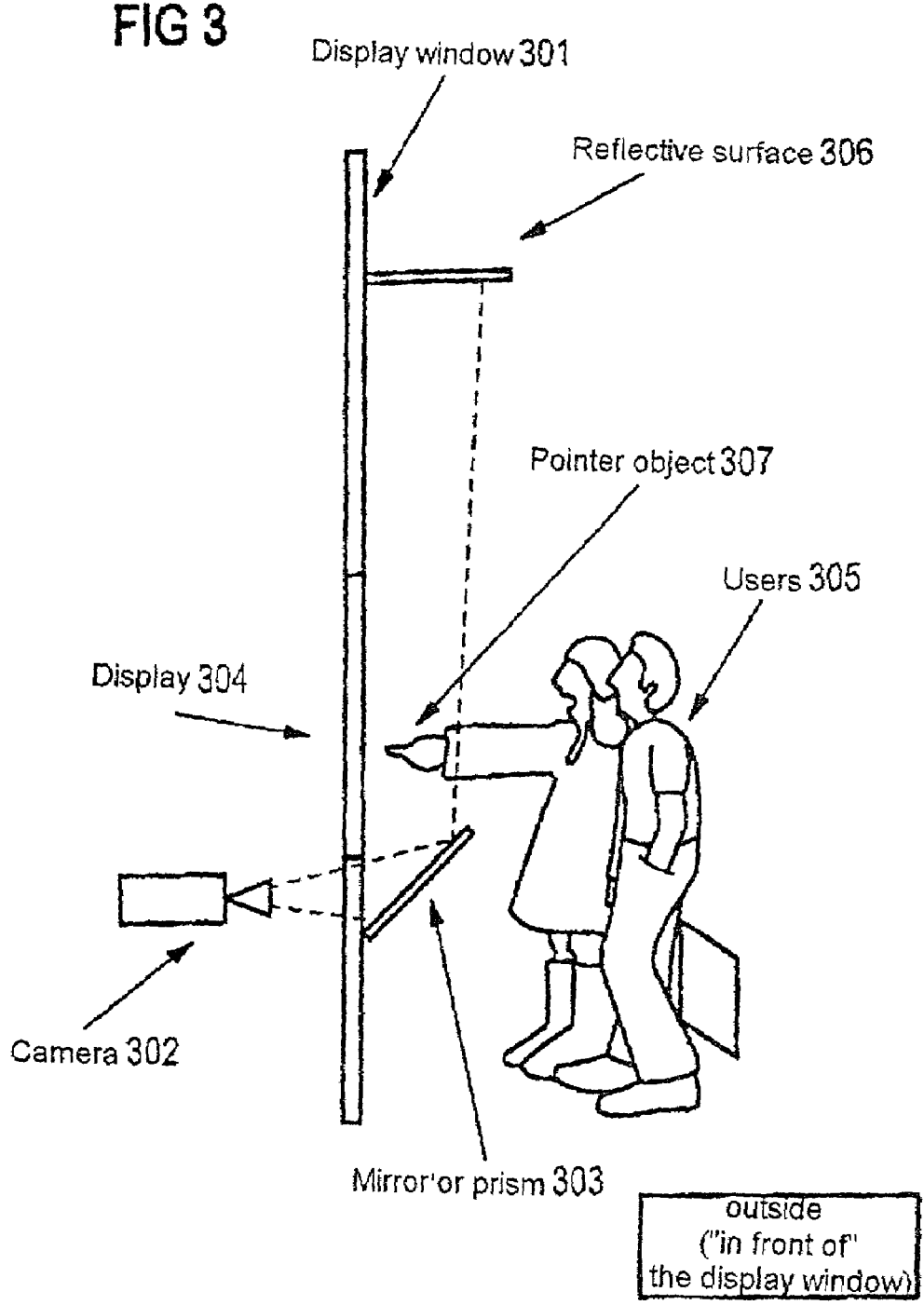
FIG. 3 is a diagrammatic, side view of a second scenario for a user's interaction with a display window according to FIG. 1.

FIG. 3 shows a side view of a second scenario for a user's 305 interaction with a display window 301. FIG. 3 is similar to FIG. 2. The difference is that there is a camera 302 together with a mirror or prism 303 below a display 304, and a reflective surface 306 is provided above the display 304. An advantageous effect is, again, that a pointer object 307 belonging to the user 305 is recognized with stark contrast. On one hand, the configuration of the camera 302, the mirror or prism 303, and the reflective surface 306 ensures that the reflective surface is protected from weathering influences and from becoming dirty and, on the other hand, the deflection unit, including the mirror or prism 303, can be in a small and inconspicuous form so that the user 305 is not faced with any kind of limitation during operation.

Figure 4:
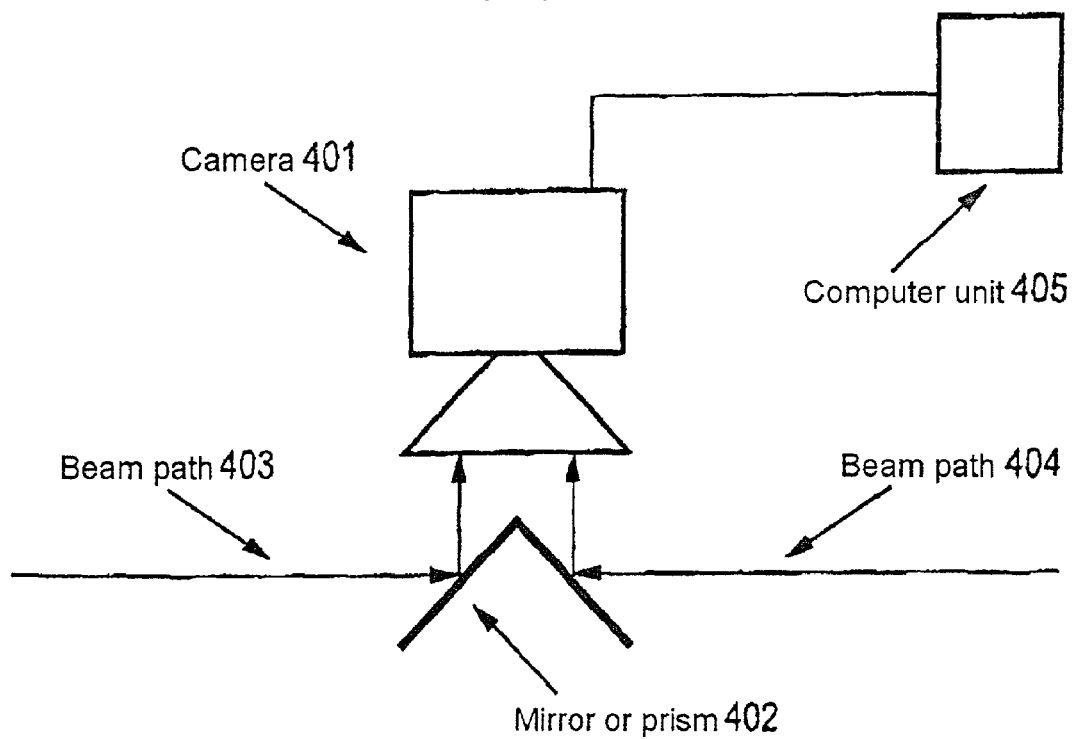
FIG. 4 is a block circuit diagram of a camera with a beam splitter used by the camera to record two different beam paths according to the invention.

FIG. 4 shows a camera 401 having a beam splitter 402, preferably, a mirror or prism, used to split a beam path from the camera 401 into two different beam paths 403 and 404. In addition, FIG. 4 shows a computer unit 405 for controlling/driving the camera 401 and evaluating images from the camera 401. During the evaluation, the computer unit 405 receives two kinds of image sequences coming from different perspectives, corresponding to beam path 403 and beam path 404. Thus, the computer unit 405 uses these sequences of two two-dimensional displays to assemble three-dimensional information to ascertain the position of the pointer object in front of the display on the display window.

Figure 5:
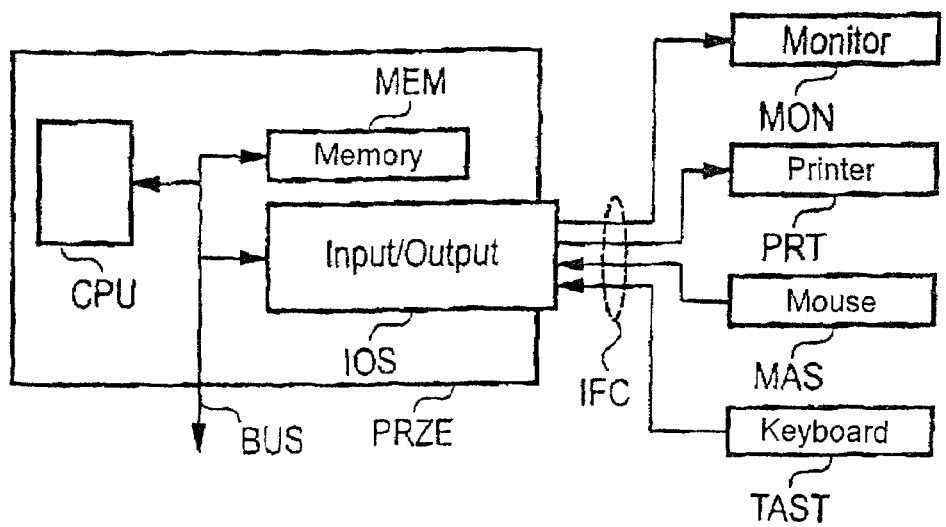
FIG. 5 is a block circuit diagram of a computer unit according to the invention.

FIG. 5 shows an example computer unit PRZE. The computer unit PRZE, including a processor CPU, a memory MEM, and an input/output interface IOS, is used in various ways through an interface IFC. A graphics interface is used to make an output visible on a monitor MON and/or to output it on a printer PRT. Input is effected using a mouse MAS or a keyboard TAST. The computer unit PRZE also has a databus BUS to ensure connection of the memory MEM, the processor CPU, and the input/output interface IOS. Furthermore, additional components can be connected to the databus BUS, e.g., an additional memory, a data store (hard disk), or a scanner.

Figure 6:
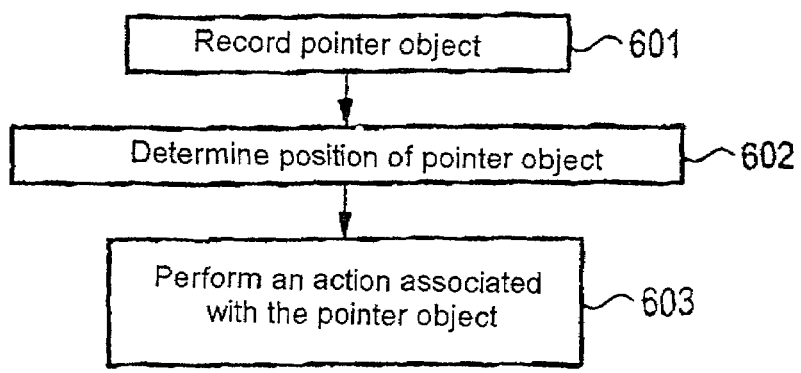
FIG. 6 is a flow diagram of a method for user interaction with a display window according to the invention.

FIG. 6 shows a flow-chart containing steps in a method for a user's interaction with a display window. In a step 601, the user's pointer object is recorded and the position of the pointer object in front of the display window is determined in a step 602, for example, by triangulation. Based on the position of the pointer object, and depending on the content of the display on the display window, the pointer object can be used to trigger a prescribed action in a step 603. For example, the triggering can, as described above, be effected by lingering on a prescribed area ("virtual switch") for a prescribed length of time or as a result of the pointer object's approaching the display window.

I claim:

1. A configuration for interacting with a display visible in a display window, comprising:
   a recording unit placed behind the display window for recording a pointer object in a vicinity of the display window;
   at least one deflection unit configured to direct a beam path from said recording unit onto a space in front of the display visible on the display window; and
   a computer unit connected to said recording unit for determining a position of the pointer object within a display of the display window.

2. The configuration according to claim 1, wherein at least part of the display is statically mounted on the display window.

3. The configuration according to claim 1, wherein at least part of the display is printed on the display window.

4. The configuration according to claim 1, including a screen, in particular a flat screen, for generating at least part of the display, said screen connected to said computer unit.

5. The configuration according to claim 1, including a flat screen for generating at least part of the display, said screen connected to said computer unit.

6. The configuration according to claim 1, including a projector for projecting at least part of the display onto the display window.

7. The configuration according to claim 1, wherein at least part of the display window is at least one of a semi-transparent area and a coated area.

8. The configuration according to claim 1, wherein said recording unit is below the display.

9. The configuration according to claim 8, including a reflective surface above the display.

10. The configuration according to claim 1, wherein said recording unit is above the display.

11. The configuration according to claim 1, including a reflective surface for reflecting a beam path from said recording unit to said recording unit, said reflective surface being disposed below the display.

12. The configuration according to claim 1, wherein said recording unit is at least one camera.

13. The configuration according to claim 1, wherein said recording unit is two cameras each recording a space in front of the display visible on the display window.

14. The configuration according to claim 1, wherein said recording unit is a camera configured to record two beam paths, and including a beam splitter for splitting a beam into the two beam paths.

15. The configuration according to claim 1, wherein said recording unit is a camera configured to record two beam paths, and including means for splitting a beam into the two beam paths.

16. The configuration according to claim 1, wherein said at least one deflection unit includes at least one of a prism and at least one mirror.

17. The configuration according to claim 1, wherein said at least one deflection unit is disposed in front of the display window.

18. The configuration according to claim 1, including an illumination unit for illuminating a space in front of the display with waves in an invisible spectral range.

19. The configuration according to claim 18, wherein said illumination unit is configured to be operated in a pulsed mode.

20. The configuration according to claim 18, wherein said illumination unit includes at least one infrared light source.

21. The configuration according to claim 20, wherein said infrared light source is an infrared light-emitting diode.

22. The configuration according to claim 1, wherein said recording unit and said computer unit are configured to determine a position of the pointer object.

23. The configuration according to claim 22, wherein said computer unit is configured to trigger a prescribed action based on the position of the pointer object.

24. The configuration according to claim 23, wherein the prescribed action is triggered by a lingering of the pointer object on a given area within the display for a prescribed length of time.

25. The configuration according to claim 23, wherein the prescribed action is triggered by an approach of the pointer object to the display window up to a prescribed proximity.

26. The configuration according to claim 22, wherein said recording unit and said computer unit are configured to determine a position of the pointer object by triangulation.

27. The configuration according to claim 1, wherein the pointer object is at least one of a hand and a finger of a user.

28. The configuration according to claim 1, wherein said recording unit and said computer unit are configured to convert a movement of the pointer object to a movement of an analog pointer instrument.

29. The configuration according to claim 1, wherein said recording unit and said computer unit are configured to convert a movement of the pointer object to a movement of a mouse pointer.

30. A method for interacting with a display visible in a display window, which comprises:
   recording a pointer object in front of and in a vicinity of the display window by placing a recording unit behind the display window;
   deflecting a beam path between the recording unit and a space in front of the display window and determining a position of the pointer object within a display of the display window; and
   triggering a prescribed action based upon the pointer object pointing to a prescribed area within the display.

31. A configuration for interacting with a display visible in a display window, comprising:
   a recording unit disposed behind the display window to record a pointer object in front of the display window;
   a deflection unit configured to deflect a beam path between said recording unit and a space in the front of the display window;
   means for determining a distance of the pointer object from the display window; and
   a computer unit connected to said recording unit and to said determining means for determining a position of the pointer object within a display of the display window.

32. The configuration according to claim 31, wherein said recording unit includes two cameras disposed to record the pointer object from different angles, and said computer unit is configured to triangulate the position of the pointer object.

* * * * *